United States Patent [19]

Nonaka et al.

[11] Patent Number: 5,108,200
[45] Date of Patent: Apr. 28, 1992

[54] COUPLER-TYPE OPTICAL SWITCH AND PROCESS FOR PRODUCING THE SAME

[75] Inventors: Tsuyoshi Nonaka; Toshifumi Hosoya; Yasuo Matsuda; Toru Yamanishi, all of Kanagawa, Japan

[73] Assignee: Sumitomo Electric Industries Ltd., Osaka, Japan

[21] Appl. No.: 577,715

[22] Filed: Sep. 9, 1990

[30] Foreign Application Priority Data

Sep. 6, 1989 [JP] Japan .................................. 1-231043
Sep. 6, 1989 [JP] Japan .................................. 1-231044

[51] Int. Cl.$^5$ ................................................ G02B 6/26
[52] U.S. Cl. ......................................... 385/16; 385/40; 385/50; 385/141
[58] Field of Search ............... 350/96.11, 96.12, 96.13, 350/96.14, 96.15, 96.29

[56] References Cited

U.S. PATENT DOCUMENTS

| | | | |
|---|---|---|---|
| 4,264,126 | 4/1981 | Sheem | 350/96.15 |
| 4,679,894 | 7/1987 | Pavlath | 350/96.15 |
| 4,786,130 | 11/1988 | Georgiou et al. | 350/96.15 |
| 4,965,020 | 10/1990 | Allen et al. | 350/96.13 X |

FOREIGN PATENT DOCUMENTS

| | | |
|---|---|---|
| 0176178 | 7/1985 | European Pat. Off. |
| 0204493 | 5/1986 | European Pat. Off. |
| 0282963 | 3/1988 | European Pat. Off. |
| 2507787 | 6/1981 | France |
| 1-116523 | 5/1989 | Japan ................. 350/96.15 |
| 1536518 | 12/1978 | United Kingdom ........... 350/96.11 |

OTHER PUBLICATIONS

Abstract of JP-A-60 107 606 Fujikura Densen K.K. in Patent Abstracts of Japan, vol. 9, No. 257 Oct. 15, 1985.

Primary Examiner—John D. Lee
Attorney, Agent, or Firm—Sughrue, Mion, Zinn, Macpeak & Seas

[57] ABSTRACT

A coupler-type optical switch and a process for producing the same are disclosed, which coupler-type optical switch comprises an optical fiber coupler and a medium surrounding the photocoupler part of the optical fiber coupler and in which the refractive index of the medium is controllable, the medium comprising an energy-curing resin or a transparent liquid material and, dispersed or dissolved in the resin or liquid material, an optical material whose refractive index changes by the action of an electric or magnetic field.

4 Claims, 1 Drawing Sheet

COUPLER-TYPE OPTICAL SWITCH AND PROCESS FOR PRODUCING THE SAME

FIELD OF THE INVENTION

The present invention relates to an optical switch for use in the field of optoelectronics and a process for producing the optical switch. More particularly, it relates to a coupler-type optical switch which comprises an optical fiber coupler of the type where glass fibers have been fusion-coupled and a medium surrounding the coupler, and in which the branching ratio in the photocoupler is changed by controlling the refractive index of the medium surrounding the coupler, and also relates to a process for producing the optical switch.

BACKGROUND OF THE INVENTION

Conventional optical switches are roughly divided into two groups, i.e., those in which light intensity is modulated by changing the refractive index of the material constituting an optical switch element and those which are allowed to perform the optical switch function by changing the extinction coefficient of the material constituting an optical switch element. As such optical materials employed in these optical switches, inorganic materials have conventionally been known, but organic nonlinear materials, such as m-nitroaniline (mNA), have been coming into use. Because of their large nonlinear optical constants and high response speeds, organic nonlinear materials are coming to be a useful material.

On the other hand, optical switches employing a photocoupler of the type in which optical fibers have been fusion-coupled are also attracting attention with progressing techniques for producing this type of optical switches.

FIG. 3 is a diagrammatic view of that optical switch employing an optical fiber coupler which is described in U.S. Pat. No. 4,786,130. In FIG. 3, numeral 1 denotes optical fibers, 2 a photocoupler part, 3 a coupler housing, 7 a medium whose refractive index changes with temperature, 8 a temperature control unit, and 9 conductors. In this optical switch, the temperature of the medium 7 surrounding the photocoupling part 2 where the optical fibers have been fusion-bonded is controlled by the temperature control unit 8, thereby changing the refractive index of the medium so as to change the branching ratio in the photocoupler. As the material for the medium 7, a silicone oil, a liquid crystal, or the like is used.

Such an optical switch employing an optical fiber coupler is excellent in optical fiber connection and is low-loss. However, the technique of controlling the refractive index of the medium surrounding the fusion-bonded part by changing the temperature of the medium is unpractical because there is a considerable response delay.

SUMMARY OF THE INVENTION

An object of the present invention is to provide a highly reliable optical switch having improved response properties compared to the conventional optical switches employing an optical fiber coupler, thereby eliminating the problem described above.

Another object of the present invention is to provide a process for producing the above optical switch.

Other objects and effects of the present invention will be apparent from the following description.

Therefore, the present invention relates to a coupler-type optical switch which comprises an optical fiber coupler and a medium surrounding the photocoupler part of the optical fiber coupler and in which the refractive index of the medium is controllable, the medium comprising an energy-curing resin or a transparent liquid material and, dispersed or dissolved in the resin or the liquid material, an optical material whose refractive index changes by the action of an electric or magnetic field.

DETAILED DESCRIPTION OF THE INVENTION

The coupler-type optical switch of the present invention is characterized in that since an optical material whose refractive index changes by the action of an electric or magnetic field has been dispersed or dissolved in the medium surrounding the photocoupler part in the optical fiber coupler, the refractive index of the medium can be changed and branching ratio can be controlled by controlling the electric or magnetic field applied to the medium.

Figure 1:
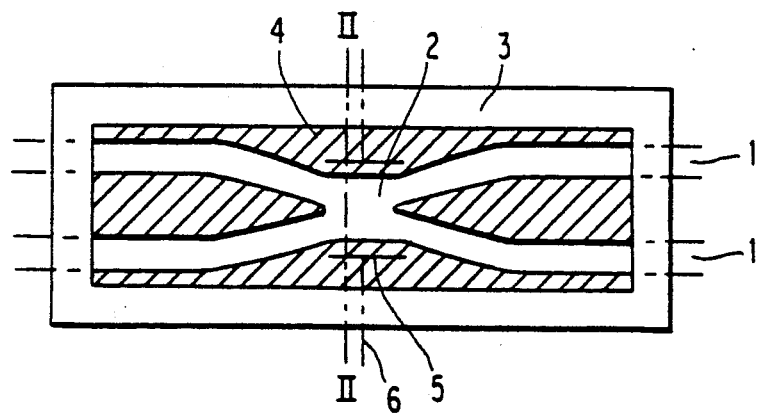
FIG. 1 is a diagrammatic view of one embodiment of the optical switch according to the present invention.
Figure 2A:
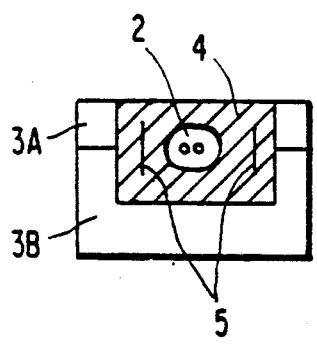
FIG. 2(a) is a cross-sectional view taken on line II—II of FIG. 1.
Figure 2B:
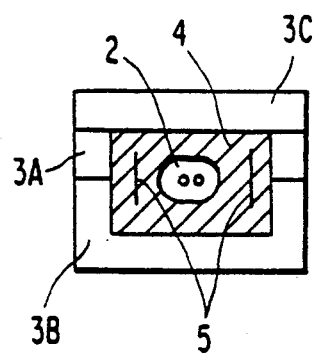
FIG. 2(b) is a cross-sectional view of another embodiment of the optical switch according to the present invention.

In FIGS. 1, 2(a), and 2(b), numeral 1 denotes two single-mode optical fibers whose claddings have been fusion-bonded to each other, 2 denotes a photocoupler part, i.e., a fusion-bonded part, 3 a coupler housing, 4 a medium surrounding the optical fiber coupler, 5 electrodes, and 6 a conductor. The medium 4 has a refractive index substantially equal to that of the claddings of the optical fibers, and comprises an optically transparent energy-curing resin or an optically transparent liquid material and, dispersed or dissolved in the resin or the liquid material, an optical material whose refractive index changes by the action of an electric field or a magnetic field. Hence, the refractive index of the medium 4 can be changed by means of an electric field or a magnetic field. The number of optical fibers is not limited to two, and may be three or more.

The energy-curing resin is not particularly limited, and any resin whose curing is conducted or accelerated by the action of a physical or chemical energy such as irradiation, heating, or addition of a hardener can be used. Further, the energy-curing resin is in general optically transparent. The energy-curing resin preferably has a molecular weight of from about 1,000 to about 100,000. Examples of such energy-curing resins that can be used include acrylic resins (e.g., polymethyl methacrylate), polyamide resins, polyether resins (e.g., polyetherether ketone or polycarbonate), polyurethane resins (e.g., urethane resin comprising polytetramethylene glycol, toluene-2,4-diisocyanate, or 2-hydroxyethylacrylate), polyamideimide resins, silicone resins (e.g., silicone resin comprising dimethyl siloxane, diphenyl siloxane, or phenylmethyl siloxane), phenolic resins, epoxy resins (e.g., "EPICOAT 828", tradename), fluororesins (e.g., a polymer prepared by polymerizing fluoroacrylate), and the like.

The optically transparent liquid materials used in the present invention basically have the same components and molecular weight as in the energy-curing resin. However, although the energy-curing resin is a material which is three-dimensionally crosslinked, is not soluble in a solvent, and is solid at room temperature, the optically transparent liquid material is a material which is not three-dimensionally crosslinked and is soluble in solvent.

Examples of optically transparent liquid materials that can be used include liquid acrylic compounds, liquid polyamide compounds, liquid polyether compounds, liquid polyurethane compounds, liquid polyamideimide compounds, liquid silicone compounds, liquid epoxy compounds, liquid fluorine compounds, and the like. Preferred of these are liquid silicone compounds (particularly, straight-chain compounds) and liquid fluorine compounds (particularly, fluoride acrylates).

As the optical material whose refractive index changes by the action of an electric field or a magnetic field, an optical material whose refractive index changes nonlinearly with electric field may preferably be used. Examples of such nonlinear optical materials include 2-methyl-4-nitroaniline (MNA), m-nitroaniline (m-NA), p-nitroaniline (p-NA), 4-diethylamino-4'-nitrostilbene (DEANS), 4-dimethylamino-4'-nitrostilbene (DANS), 2-(ethyl(4-((4-nitrophenyl)azo)phenyl)amino)ethanol (redl), 4-dipropylamino-4'-nitrostilbene, 4-dibutylamino-4'-nitrostilbene, 4-dipentylamino-4'-nitrostilbene, 4-dihexylamino-4'-nitrostilbene, 2-(methyl(4-((4-nitrophenyl)azo)phenyl)amino)ethanol, 2-((4-((4-nitrophenyl)azo)phenyl)amino)ethanol, 2-(propyl(4-((4-nitrophenyl)azo)phenyl)amino)ethanol, 2-(butyl(4-((4-nitrophenyl)azo)phenyl)amino)ethanol, 2-(pentyl(4-((4-nitrophenyl)azo)phenyl)amino)ethanol, 2-(hexyl(4-((4-nitrophenyl)azo)phenyl)amino)ethanol, 2-(ethyl(4-((4-nitrophenyl)azo)phenyl)amino)methanol, 2-(ethyl(4-((4-nitrophenyl)azo)phenyl)amino)propanol, 2-(ethyl(4-((4-nitrophenyl)azo)phenyl)amino)butanol, 2-(ethyl(4-((4-nitrophenyl)azo)phenyl)amino)pentanol, 2-(ethyl(4-((4-nitrophenyl)azo)phenyl)amino)hexanol, 3-methyl-4-nitropyridine-1-oxide, 3-methyl(2,4-dinitrophenyl)aminopropanate, N-4-nitrophenylprolinol, 2-((4-((4-nitrophenyl)azo)phenyl)amino)methanol, 2-((4-((4-nitrophenyl)azo)phenyl)amino)propanol, 2-((4-((4-nitrophenyl)azo)phenyl)amino)butanol, 2-((4-((4-nitrophenyl)azo)phenyl)amino)pentanol, 2-((4-((4-nitrophenyl)azo)phenyl)amino)hexanol, 2-(methyl(4-((4-nitrophenyl)azo)phenyl)amino)methanol, 2-(methyl(4-((4-nitrophenyl)azo)phenyl)amino)propanol, 2-(methyl(4-((4-nitrophenyl)azo)phenyl)amino)butanol, 2-(methyl(4-((4-nitrophenyl)azo)phenyl)amino)pentanol, 2-(methyl(4-((4-nitrophenyl)azo)phenyl)amino)hexanol, 2-(propyl(4-((4-nitrophenyl)azo)phenyl)amino)methanol, 2-(propyl(4-((4-nitrophenyl)azo)phenyl)amino)propanol, 2-(propyl(4-((4-nitrophenyl)azo)phenyl)amino)butanol, 2-(propyl(4-((4-nitrophenyl)azo)phenyl)amino)pentanol, 2-(propyl(4-((4-nitrophenyl)azo)phenyl)amino)hexanol, 2-(butyl(4-((4-nitrophenyl)azo)phenyl)amino)methanol, 2-(butyl(4-((4-nitrophenyl)azo)phenyl)amino)propanol, 2-(butyl(4-((4-nitrophenyl)azo)phenyl)amino)butanol, 2-(butyl(4-((4-nitrophenyl)azo)phenyl)amino)pentanol, 2-(butyl(4-((4-nitrophenyl)azo)phenyl)amino)hexanol, 2-(pentyl(4-((4-nitrophenyl)azo)phenyl)amino)methanol, 2-(pentyl(4-((4-nitrophenyl)azo)phenyl)amino)propanol, 2-(pentyl(4-((4-nitrophenyl)azo)phenyl)amino)butanol, 2-(pentyl(4-((4-nitrophenyl)azo)phenyl)amino)pentanol, 2-(pentyl(4-((4-nitrophenyl)azo)phenyl)amino)hexanol, 2-(hexyl(4-((4-nitrophenyl)azo)phenyl)amino)methanol, 2-(hexyl(4-((4-nitrophenyl)azo)phenyl)amino)propanol, 2-(hexyl(4-((4-nitrophenyl)azo)phenyl)amino)butanol, 2-(hexyl(4-((4-nitrophenyl)azo)phenyl)amino)pentanol, 2-(hexyl(4-((4-nitrophenyl)azo)phenyl)amino)hexanol, and the like. Among the above compounds, MNA, m-NA, DANS and redl are preferably used in the present invention, and DANS and redl are particularly preferred.

The optical material is dispersed or dissolved in the medium in an amount (concentration) of 5 to 50 wt %, preferably 10 to 40 wt % and more preferably 20 to 30 wt %.

It is preferable that the refractive index of the medium in which such an optical material has been dispersed or dissolved be slightly smaller (e.g., about 0.02–0.03 smaller) than that of the claddings of the glass fibers coupled in the coupler. In the case of quartz claddings, for example, the range of the refractive index of the medium is preferably from about 1.40 to about 1.45, and more preferably from about 1.44 to abuot 1.45.

Since the refractive index change of the above-described medium due to a change in electric or magnetic field takes place at an exceedingly high speed, high-speed switching is possible.

An embodiment of a process for producing the coupler-type optical switch of the present invention is explained below. An optical fiber coupler in which optical fibers have been fusion-bonded and drawn is housed in a coupler housing 3 to which electrodes 5 have been attached. It is preferable that the coupler housing be made to be separated at the optical fiber-passing regions into the upper part 3A and the lower part 3B, because the coupler housing can be set up with the optical fibers fusion-bonded and drawn on a drawing table being kept as they are and, hence, there is no fear of the properties of the optical fibers being changed. An adhesive is applied to the optical fiber-passing regions and the joint between the upper and lower parts to bond the optical fibers to the upper and lower parts and to bond the upper part with the lower part. Thereafter, the above-described medium is filled into the resulting coupler housing.

In the case where the medium is a composition comprising an energy-curing resin, the resin composition is cured by irradiating, e.g., with ultraviolet rays. Prior to the curing step, the resin composition may be placed in an electric field to orientate the nonlinear optical material dissolved or dispersed therein. Alternatively, the orientation treatment may be conducted simultaneously with the curing step. Since the nonlinear optical material is orientated to a high degree by the orientation treatment, the optical material can retain its nonlinear optical properties over a prolonged period of time.

Accordingly, the present invention provides a process for producing a coupler-type optical switch, which comprises placing an uncured resin composition comprising an energy-curing resin and, dispersed or dissolved in the resin, an optical material whose refractive index changes by the action of an electric or magnetic field, around an optical fiber coupler so that the photocoupling part of the coupler is surrounded by the resin composition, and then curing the resin composition after the resin composition is subjected to an orientation treatment or while the resin composition is being subjected to an orientation treatment.

In the case where the medium comprises a transparent liquid material, it is preferred that the coupler housing be provided with a housing lid 3C as shown in FIG. 2(b), and after the medium has been filled into the housing, the housing lid be bonded to seal the housing so as to prevent leakage of the medium that is liquid. This construction makes handling of the photocoupler easy.

The coupler housing serves not only to house the optical fiber coupler but also to support it.

In place of dividing the coupler housing into two parts, notches may be formed which extend to the optical fiber-passing regions. In this case, the notches may be filled with an adhesive after optical fibers are placed to pass through the notches.

The present invention will be explained in more detail by reference to the following Example and Comparative Example, but the Example should not be construed to be limiting the scope of the invention.

EXAMPLE AND COMPARATIVE EXAMPLE

Coupler-type optical switches of the structure shown in FIG. 1 were prepared by use of the energy-curing resins or transparent liquid materials and the nonlinear optical materials all of which are shown in Table 1. Samples Nos. 1 to 12 were prepared by use of energy-curing resins as the medium, while samples Nos. 13 to 24 were prepared by use of transparent liquid materials as the medium. The optical fibers used were single-mode.

TABLE 1

| Sample No. | Energy-curable resin or transparent liquid material | Nonlinear optical material |
| --- | --- | --- |
| 1 | UV-curing acrylic resin*1 | MNA |
| 2 | " | m-NA |
| 3 | " | DANS |
| 4 | " | red1 |
| 5 | UV-curing fluoro resin*2 | MNA |
| 6 | " | m-NA |
| 7 | " | DANS |
| 8 | " | red1 |
| 9 | Heat-curing silicon resin*3 | MNA |
| 10 | " | m-NA |
| 11 | " | DANS |
| 12 | " | red1 |
| 13 | Acrylic oil*4 | MNA |
| 14 | " | m-NA |
| 15 | " | DANS |
| 16 | " | red1 |
| 17 | Fluorine oil*5 | MNA |
| 18 | " | m-NA |
| 19 | " | DANS |
| 20 | " | red1 |
| 21 | Silicone oil*6 | MNA |
| 22 | " | m-NA |
| 23 | " | DANS |
| 24 | " | red1 |

*1 Acrylic resin having, as a main component, an oligomer comprising polytetraethylene glycol, toluene-2,4-diisocyanate and hydroxyethyl acrylate
*2 Resin comprising fluoroacrylate
*3 Dimethyl siloxane having vinyl group at the terminals thereof
*4 Oil prepared by dissolving low molecular weight polymethyl methacrylate in a polar solvent
*5 Oil comprising florine-substituted hydrocarbon
*6 Oil comprising dimethyl siloxane as a main component The refractive indexes of the media of samples Nos. 1 to 24 all were in the range of from 1.41 to 1.44 at a wavelength of 1.3 μm.

With respect to samples Nos. 1 to 12, the resin compositions were cured while an electric field of about 100 KV/cm was being applied to the resin compositions to orientate the nonlinear optical materials. The resin compositions in samples Nos. 1 to 8 were cured by means of ultraviolet irradiation, while those in samples Nos. 9 to 12 were cured by means of heating at about 80° C.

Light having a wavelength of 1.3 μm was transmitted to each of the thus-obtained optical switches, and the switching time was measured in terms of output signal switching rate by sending control signals to the electrodes. As a result, all the optical switches were ascertained to be able to perform switching at rates of 1 msec or less.

Figure 3:
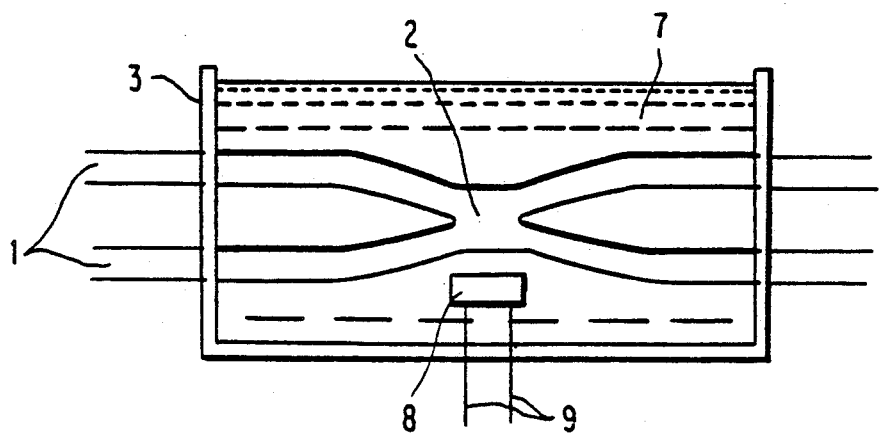
FIG. 3 is diagrammatic view of a prior art optical switch.

For the purpose of comparison, an optical switch of the structure as shown in FIG. 3 was prepared. As the medium surrounding the fusion-bonded part, a silicone oil having a refractive index of 1.44 at 25° C. was used. This optical switch showed a switching time of 10 msec or more.

As apparent from the above description, the coupler-type optical switch according to the present invention can perform switching of light paths within a very short period of time since the refractive index of the medium surrounding the photocoupling part in the optical fiber coupler can be changed by the action of an electric or magnetic field, and further the optical switch is excellent in optical fiber connection, is low-loss, and has a simple structure.

In the case where the medium to be used for preparing a coupler-type optical switch comprises an energy-curing resin and a nonlinear optical material, the nonlinear optical material can be made to retain its properties over a prolonged period of time by subjecting the medium to orientation treatment when the medium is used to produce the optical switch.

While the invention has been described in detail and with reference to specific embodiments thereof, it will be apparent to one skilled in the art that various changes and modifications can be made therein without departing from the spirit and scope thereof.

What is claimed is:

1. A coupler-type optical switch which comprises an optical fiber coupler and a medium surrounding the photocoupler part of the optical fiber coupler and in which the refractive index of said medium is controllable, said medium comprising an energy-curing resin and, dispersed or dissolved in said resin, an optical material whose refractive index changes by the action of an electric or magnetic field.

2. A coupler-type optical switch as claimed in claim 1, wherein said energy-curing resin is selected from the group consisting f an acrylic resin, a polyamide resin, a polyether resin, a polyurethane resin, a poly(amide-imide) resin, a silicon resin, a phenolic resin, an epoxy resin, and a fluoro resin.

3. A coupler-type optical switch as claimed in claim 1, wherein the cladding of said optical fiber is a quartz cladding and the refractive index of said material is from about 1.40 to about 1.45.

4. A process for producing a coupler-type optical switch, which comprises placing an uncured resin composition comprising an energy-curing resin and, dispersed or dissolved in said resin, an optical material whose refractive index changes by the action of an electric or magnetic field, around an optical fiber coupler so that the photocoupling part of the coupler is surrounded by the resin composition, and then curing the resin composition after the resin composition is subjected to an orientation treatment or while the resin composition is being subjected to an orientation treatment.

* * * * *